US 8,489,440 B2
Jul. 16, 2013

(12) United States Patent
Salwitz et al.

(54) EARNED VALUE APPLICATION

(75) Inventors: Kenneth Salwitz, Horsham, PA (US); Edwin Keith Lee, Fort Worth, TX (US); Kevin E. Kane, Marietta, GA (US); Jay L. Wilson, Arlington, TX (US); Glenn Crowe, Wayne, PA (US); Phillipus C. Loots, Glen Mills, PA (US); Franz Hero, Sunnyvale, CA (US); Theresa Rajczi, West Chester, PA (US); Phillip Leisey-Bartsch, Exton, PA (US)

(73) Assignee: SAP Aktiengesellschaft, Walldorf (DE)

( * ) Notice: Subject to any disclaimer, the term of this patent is extended or adjusted under 35 U.S.C. 154(b) by 1803 days.

(21) Appl. No.: 10/678,746

(22) Filed: Oct. 2, 2003

(65) Prior Publication Data
US 2004/0068419 A1    Apr. 8, 2004

Related U.S. Application Data

(60) Provisional application No. 60/416,099, filed on Oct. 3, 2002.

(51) Int. Cl.
*G06Q 10/00* (2012.01)

(52) U.S. Cl.
USPC ........................................................ 705/7.12

(58) Field of Classification Search
USPC ........................................................ 705/7, 8
See application file for complete search history.

(56) References Cited

U.S. PATENT DOCUMENTS

| | | | | |
|---|---|---|---|---|
| 5,381,332 A * | 1/1995 | Wood | | 705/8 |
| 5,761,674 A * | 6/1998 | Ito | | 1/1 |
| 5,907,490 A * | 5/1999 | Oliver | | 700/90 |
| 6,978,281 B1 * | 12/2005 | Kruy et al. | | 707/203 |
| 2003/0105657 A1 * | 6/2003 | Nandigama et al. | | 705/9 |
| 2003/0229618 A1 * | 12/2003 | Judy | | 707/1 |

OTHER PUBLICATIONS

Microsoft Corporation. "Microsoft Project 98 Support Course." Jun. 1998.*
Microsoft Corporation. "Microsoft Project 2002 Training Courseware: Lesson 19: Earned Value." Jun. 2002.*
Microsoft Corporation. "Microsoft Project 2002 Training Courseware: Lesson 20: Multiple Projects." Jun. 2002.*
Kaminski, Paul. "Industry Standard Guidelines for Earned Value Management Systems." Dec. 1996.*
Basford, Jerry L. "Earned Value Reporting for the Department of Energy." Ph.D. Dissertation, Walden University (Nov. 1999).*
Bachman, David C. "Single Point Adjustments: A New Definition with Examples." Acquisition Review Quarterly (Fall 2001).*
Fleming, Quentin W., and Joel M. Koppelman. "The Essence and Evolution of Earned Value." Cost Engineering, 36:11 (Nov. 1994). pp. 21-27.*

(Continued)

*Primary Examiner* — Jonathan G Sterrett
(74) *Attorney, Agent, or Firm* — Fish & Richardson P.C.

(57) ABSTRACT

Obtaining an earned value includes storing a simulation version of a project baseline. The project baseline includes tasks that define a project associated with the project baseline. The simulation version is copied to create an operative version of the project baseline. The simulation version is augmented with an additional task such that the simulation version maintains separate baselines for the additional task and for pre-existing tasks. The additional task is mapped from the simulation version to the operative version such that the operative version incorporates the additional task and the pre-existing task into a single baseline. The earned value is obtained for the project using the operative version.

18 Claims, 13 Drawing Sheets

OTHER PUBLICATIONS

Kauffmann, Paul, et al. "Using Earned Value Methods to Substantiate Change-of-Scope Claims." Engineering Management Journal, 14:1 (Mar. 2002). pp. 13-20.*

Christensen, David S. "Using the Earned Value Cost Management Report to Evaluate the Contractor's Estimate at Completion." Acquisition Review Quarterly (Summer 1999).*

Stark, George, and Robert C. Durst. "Using Metrics in Management Decision Making." Computer (Sep. 1994). pp. 42-48.*

Cass, Donald J. "Earned Value Programs for US Department of Energy Projects." Cost Engineering, 42:2 (Feb. 2000). pp. 24-43.*

Garden, Gary W. and Robert C. Creese. "Cash Flow Analysis in Construction Projects." AACE International Transactions (2000).*

Hayes, Heather B., and Jim Miller. "Using Earned-Value Analysis for Better Project Management." Biopharm, 15:3 (Mar. 2002). pp. 58-60.*

Town, Charles. "Project Control and Earned Value Management." Management Accounting, 76:8 (Sep. 1998). pp. 22-24.*

Kim, EunHong. "A Study on the Effective Implementation of Earned Value Management Methodology." Ph.D. Dissertation, The George Washington University (May 2000).*

Fleming, Quentin W. and Joel M. Koppelman, "Earned Value Project Management: A Powerful Tool for Software Projects." Crosstalk: The Journal of Defense Software Engineering, 19-23 (Jul. 1998).*

Users Guide for Microsoft Project for Windows 95 and Windows 3.1 (1995), pp. 121-127.*

Microsoft Project 98 Support Course (1998), pp. 5-113 through 5-136.*

Microsoft Project 2002 Training Courseware: Lesson 18: Tracking Progress (Jun. 2002), pp. 1-32.*

"CS Solutions—Support" [online] Retrieved from the Internet: <URL: http://web.archive.org/web/20040401103957/http://cs-solutions.com/support/support.html> (© 2000).

"Earned Value Policy Documents—Current Policy" [online] Retrieved from the Internet: <URL: http://www.acq.osd.mil/pm/currentpolicy/currentpolicy.html> (circa 2005).

U.S. Dept. of Defense, "Earned Value Management Implementation Guide", [online] Retrieved from the Internet: <URL: http://guidebook.dcma.mil/79/EVMIG.doc.> (Oct. 2006).

EIA Standard 748-A-1998 [online] Retrieved from the Internet: <URL: http://www.srs.gov/general/EFCOG/02GovtReferences/03NDIAANSI/ANSIEIA748.pdf> (Jun. 1998).

Fleming & Koppelman, "Earned Value Lite: Earned Value for the Masses" [online] Retrieved from the Internet: <URL: www.nu-solutions.com/downloads/earned_value_lite.pdf> (2007).

"32 Guidelines for ANSI EIA 748 EVMS" [online] Retrieved from the Internet: <URL: http://www.evmservices.com/EVMSolutions/PortalBasedApproach/32EVMSGuidelines.aspx> (© 2010).

* cited by examiner

EARNED VALUE APPLICATION

CROSS-REFERENCE TO RELATED APPLICATION

This patent application claims priority to U.S. Provisional Application No. 60/416,099, which was filed on Oct. 3, 2002, the contents of which are hereby incorporated by reference into this application as if set forth herein in full.

TECHNICAL FIELD

This patent application relates generally to obtaining an earned value for a project and, more specifically, to obtaining the earned value while preserving an original performance baseline for the project.

BACKGROUND

A project may be divided into individual tasks, examples of which are work breakdown structures ("WBS"). Each task may be assigned a value that the task is worth. The value may be monetary or hourly. That is, each task may be assigned a particular dollar value that accrues upon its completion. Likewise, each task may be valued in terms of the number of hour required to complete the task.

The term "earned value" refers to the value associated with tasks following completion or partial completion. For example, a project may include five tasks, each of which is valued at 10 hours and $100. Completing two of these tasks will result in earned value of 20 hours, or $200.

Earned value is determined based on budgeted hours and cost for completion, not actual hours and cost. In the above example, it actually may have taken 50 hours to complete two tasks. However, the 50 hours it took to complete the two tasks is not taken into account when determining earned value. In this example, the earned value remains 20 hours for completing the two tasks.

Customers often require periodic reporting of earned value in order to gauge progress through a project. In the aerospace and defense industry in particular, the United States ("U.S.") government often requires earned value reporting, and has stringent requirements that firms must comply with when reporting earned value.

SUMMARY

In general, in one aspect, the invention is directed to storing a simulation version of a project baseline, copying the simulation version to create an operative version of the project baseline, and obtaining, via the operative version, an earned value for a project that corresponds to the project baseline. By maintaining a simulation version, it is possible to preserve the original project baseline while still providing up-to-date earned value information via the operative version.

The foregoing aspect of the invention may include one or more of the following features.

The earned value may be obtained based on an amount of work done on the project and a pre-assigned value for the project baseline. The amount of work done may correspond to a portion of the project that has been completed. The project baseline may include a number of tasks, each of which has an assigned value. Obtaining the earned value may include determining which of the tasks has been completed, and combining assigned values for completed tasks.

Obtaining the earned value may further include augmenting the simulation version with a task, mapping the task to the operative version, and reformulating the operative version to account for the task prior to obtaining the earned value. The task may be selected from among other tasks for mapping to the operative version.

Augmenting the simulation version may include adding the task to the simulation version but keeping the task separate from previously-existing tasks on the simulation version. Reformulating the operative version may include incorporating the task into the operative version so that an object containing the project baseline is changed to accommodate the task. The operative version may be reformulated so that a portion of the operative version that precedes a time that the task is incorporated is unchanged, and so that a portion of the operative version that succeeds a time that the task is incorporated is changed.

In general, in another aspect, the invention is directed to storing a simulation version of a project baseline, where the project baseline includes tasks that define a project associated with the project baseline, and copying the simulation version to create an operative version of the project baseline. This aspect also includes augmenting the simulation version with an additional task, where the simulation version maintains separate baselines (e.g., objects) for the additional task and for pre-existing tasks, and mapping the additional task from the simulation version to the operative version, where the operative version incorporates the additional task and the pre-existing task into a single baseline (e.g., object). This aspect obtains an earned value for the project using the operative version.

The foregoing aspect of the invention may include one or more of the following features.

Mapping the additional task may include reformulating the operative version so that a portion of the operative version that precedes a time that the task is incorporated is unchanged, and reformulating the operative version so that a portion of the operative version that succeeds a time that the task is incorporated is changed. The project baseline may include a time baseline having assigned tasks, each of the tasks having a value. Obtaining the earned value may include determining which of the assigned tasks has been completed, and summing the values for completed tasks. The separate baselines for the additional task and for pre-existing tasks may be associated in memory.

In general, in another aspect, the invention is directed to storing a baseline for a project, where the baseline includes work to be performed on the project over a period of time, storing a budget associated with the baseline, where the budget includes a budget for work to be performed, and revising the budget by setting the budget for the work to be performed to be equal to a budget for work performed. This aspect may also include setting the budget for the work to be performed and the budget for work performed to be equal to a cost of the actual work performed, and/or reassigning value on the baseline to a different time on the baseline.

Other features and advantages of the invention will become apparent from the following description, including the claims and drawings.

DESCRIPTION OF THE DRAWINGS

Like reference numerals in different figures indicate like elements.

DESCRIPTION

The earned value application described herein provides project management professionals with the ability to manipulate and extract performance data for a project. The application is comprised of three components: baseline maintenance, over target baseline, and a third-party software interface. Each component may be implemented as one or more software routines within the earned value application. The components are described below.

Baseline Maintenance

The baseline maintenance component provides functionality to obtain earned value for a project while preserving an original performance baseline for the project. In this context, the performance baseline (or simply "baseline") captures information for a project, such as technical work to be performed, performance requirements, time limitations, and resource constraints. The baseline also defines a project completion schedule comprised of multiple tasks, together with values associated with those tasks. The tasks may include WBSs and predefined sub-tasks. In this regard, each WBS may include sub-tasks, called networks and activities. A network defines a collection of related activities, while a WBS defines a collection of related networks. It is noted that other information, which is not described herein, may also be included within a project baseline.

During the course of a project, the project's baseline may change for one reason or another. For example, a task may be added to the project, resulting in an extension of the project's completion date. The baseline of the project thus may need to be updated to take into account the additional task. The baseline maintenance component allows the project baseline to be updated, and earned value to be obtained from the updated baseline, while preserving the project's original baseline.

Figure 1:
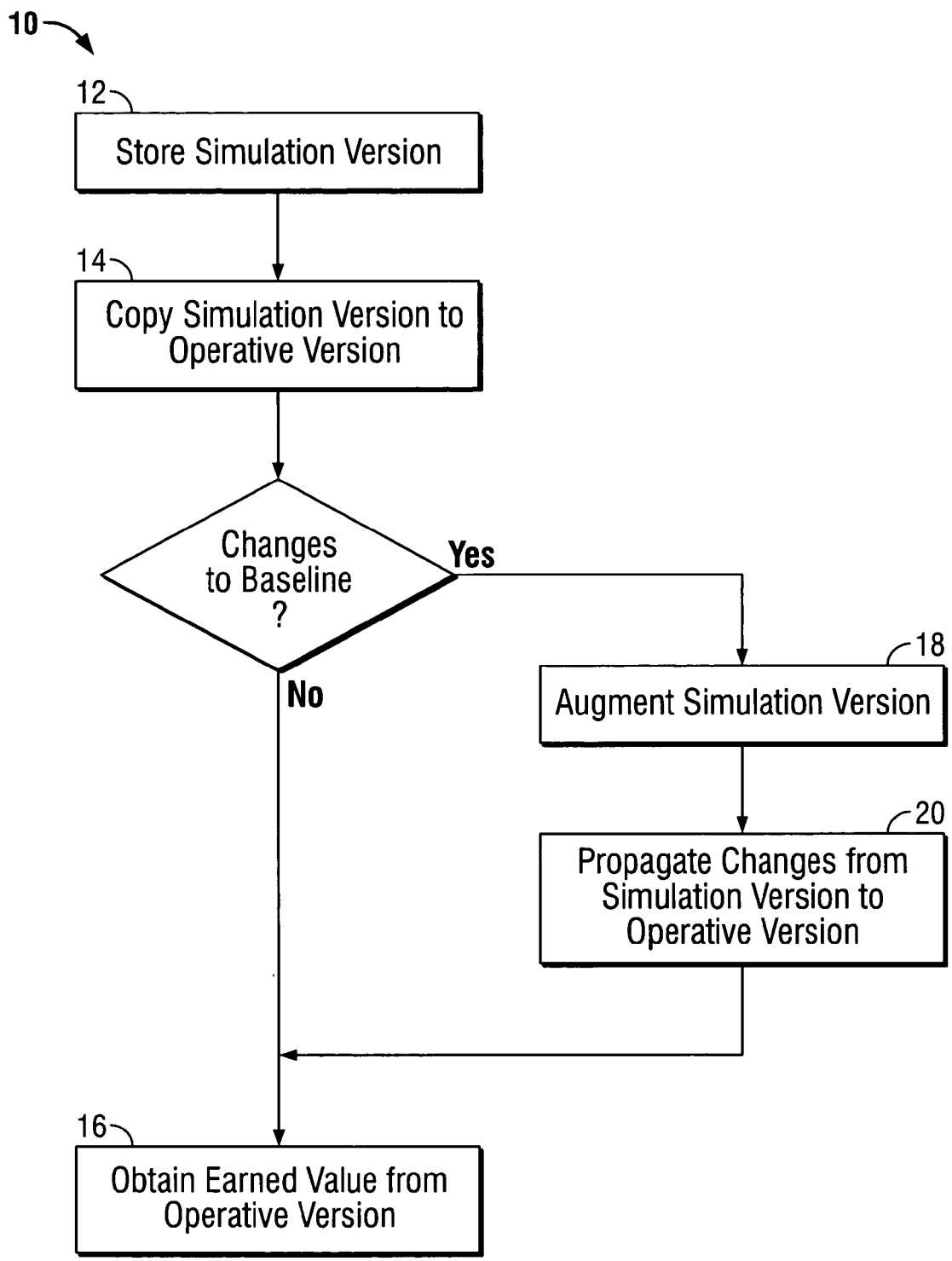
FIG. 1 is flowchart showing a process for obtaining earned value from a project baseline.

Referring to FIG. 1, a process 10 is shown for implementing the baseline maintenance component. Process 10 stores (12) a simulation version of a project baseline. The simulation version may include objects that contain information defining the original, unaltered project baseline. The simulation version may be augmented, as described below, but the object(s) already contained in the simulation version are not modified.

Process 10 copies (14) the simulation version to create an operative version of the project baseline. Initially, the operative version contains the same information as the simulation version. However, as described below, the operative version can be modified (i.e., updated). The operative version may be stored in the same memory or memory area as the simulation version, or it may be stored in a different memory/memory area.

Information (e.g., objects) in the simulation version is mapped to corresponding information in the operative version. This mapping enables objects to be transferred from the simulation version to the operative version, and for information in the operative version to be related back to the simulation version. A mapping table may be used to map data (e.g., objects) between the two versions. The mapping table may be stored with the simulation version and/or the operative version. Means other than a mapping table may also be used to relate data in the simulation version and data in the operative version.

If there are no changes to the baseline, process 10 may obtain (16) an earned value for the project. Earned value is obtained via the operative version, not the simulation version. To obtain the earned value, process 10 determines which tasks of the project have been completed. Process 10 may receive a user input to make this determination or the determination may be made automatically (e.g., by referencing a database).

Process 10 obtains, from the operative version, assigned values for the tasks (or portions thereof) that have been completed and sums the assigned values. This sum constitutes the current earned value for the project. By way of example, assume that a project includes five tasks, each of which is valued at 10 hours and $100. If two of the tasks have been completed at the time earned value is obtained, process 10 sums the value of each task (i.e., 10 hours and $100), resulting in an earned value of 20 hours and $200.

A project's baseline may need to be changed for one reason or another. Changes to a project's baseline are effected via the simulation version. Specifically, changes are made to the simulation version and then propagated to the operative version. Changes made to the simulation version do not affect objects already stored in the simulation version. That is, the existing project baseline in the simulation version is not modified.

Changes to the simulation version comprise additional object(s) that is/are stored in association with existing object(s) that define(s) the project baseline. For example, if it becomes necessary to extend a project's completion schedule in time, the extension of time is stored as a separate object within the simulation version. The new object may define, e.g., an extension of the schedule for completing the project. Object(s) defining the existing schedule is/are not modified.

Thus, process 10 may augment (18) the simulation version in the event of changes to the project baseline. As noted, process 10 augments the simulation version by storing updates to the project baseline as object(s) associated with the original project baseline object(s).

In this way, the project baseline can be kept current while the original project baseline remains uncorrupted. Retaining the original project baseline enables project management professionals to track changes during the project.

Process 10 propagates (20) changes from the simulation version to the operative version. In particular, the changes made to the simulation version are mapped to the operative version, where they are combined with existing operative version data to create an updated project baseline. The operative version, unlike the simulation version, does not store updates to the baseline as separate objects. Rather, the updates (objects) are combined to form an updated project baseline. For example, an object in the operative version defining project milestone dates may be modified to reflect new project milestone dates associated with a new completion schedule.

Modifications to the operative version of the baseline only affect the future (i.e., from the present forward). For example, if schedule changes are made to the operative version, the project's baseline is affected only from the time the changes are made forward in time. The baseline prior to that time remains unchanged. This is a significant advantage over existing earned value applications, which redistribute task values over the entire life of a project, regardless of whether the activities occurred in the past (i.e., have already occurred).

As above, process 10 obtains (16) the earned value by referencing the operative version. Specifically, process 10 determines which tasks (e.g., WBSs) have been completed in the project's baseline (e.g., based on user input or reference to a database), retrieves the stored values for completed tasks, and sums these stored values to obtain the earned value. Process 10 may generate a report to provide the earned value to a project management professional running the earned value application described herein.

In this regard, process 10 may generate a user interface during its operation. The user interface may include various screens to specify a number of parameters relating to the simulation version and the operative version. For example, the user interface may include a "transfer transaction" screen to copy (transfer) all or part of the simulation version to the operative version.

The transfer transaction screen may include selection options/parameters to identify a simulation version (or a portion thereof) to be copied and an operative version to which the simulation version is to be copied. In addition, the user interface may provide configuration options. For example, a table may be provided to map simulation version objects to appropriate parts of the operative version objects. Entries defining the simulation version may include a simulation version number, a simulation project definition, a simulation version WBS, a simulation version network number, and a simulation version activity element. Entries defining the operative version may include an operative version project definition, an operative version WBS element, an operative version network number, and an operative version activity element.

Figure 2:
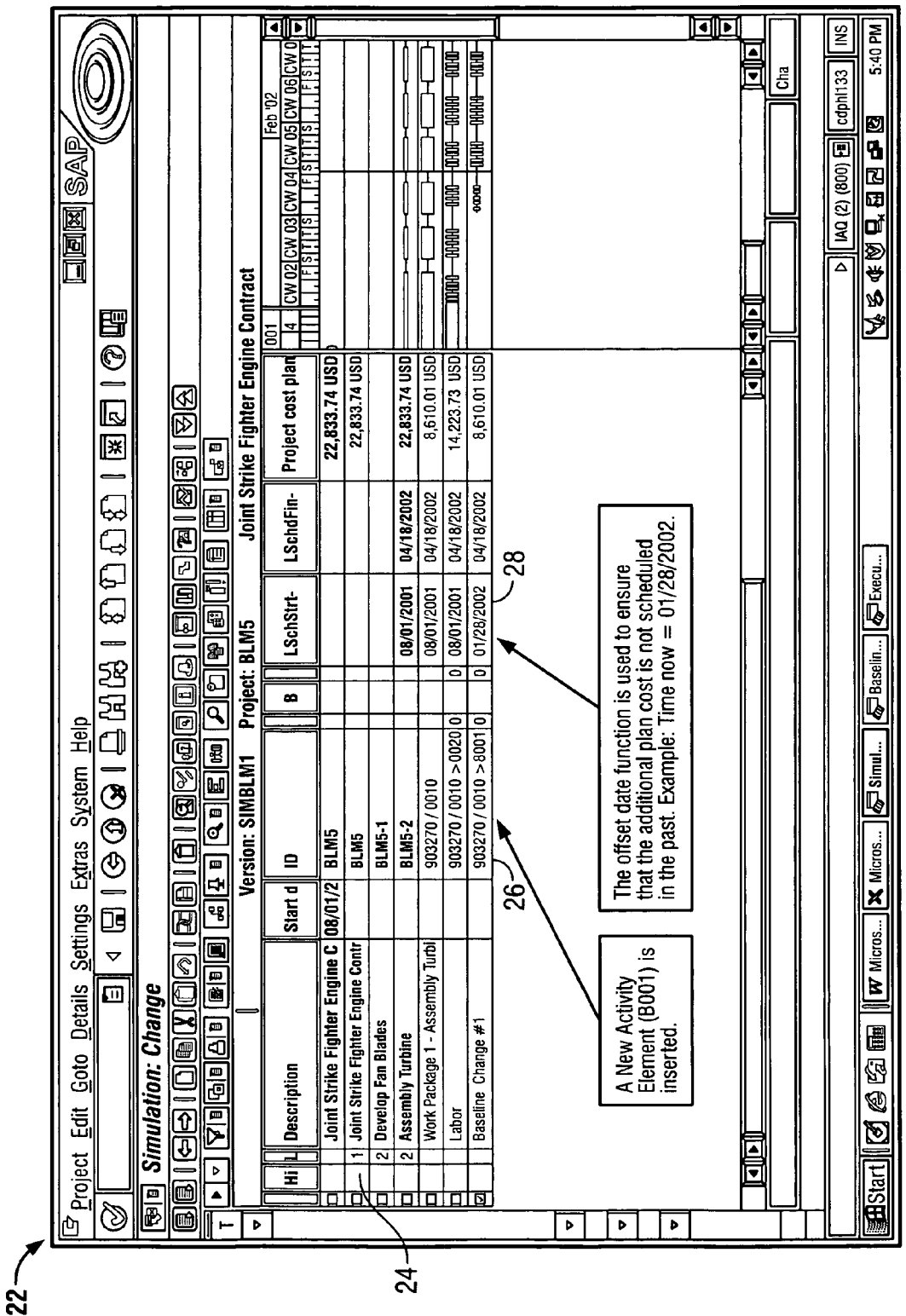
FIGS. 2 to 12 are screen shots showing various screens generated by the earned value application described herein.
Figure 3:
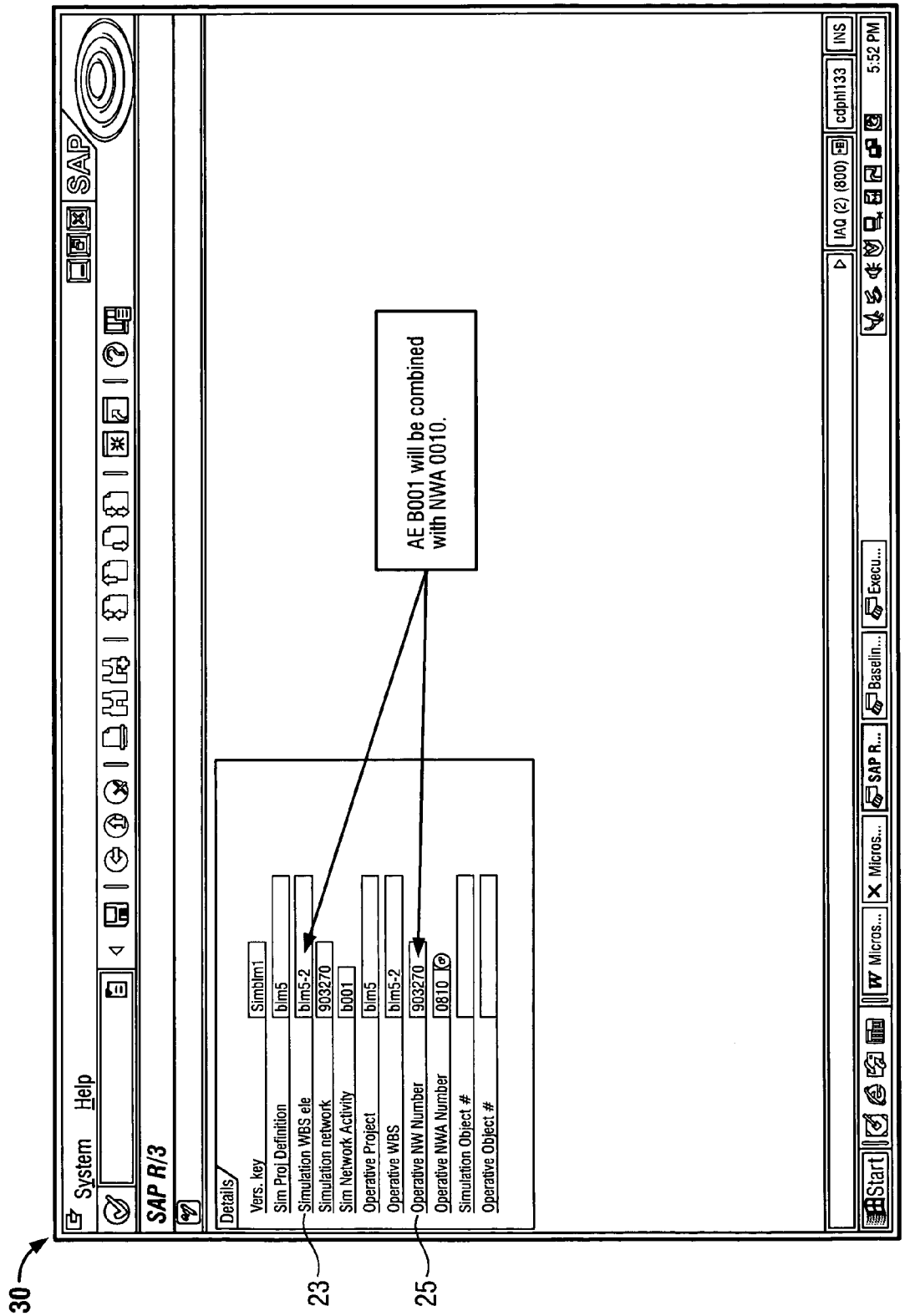

FIG. 2 shows an example of screen 22 included in the user interface generated by process 10. Screen 22 identifies a simulation project 24, a new activity element 26 to be inserted into the simulation project, and an offset date 28. Updates to the operative version occur after the offset date, thus ensuring that changes are not propagated into the past. Once the new activity is inserted into the simulation version, an entry is made into a mapping table, which is used to map elements from the simulation version to the operative version. An example of the mapping table is shown in screen 30 of FIG. 3. As shown, the mapping table identifies a simulation WBS 23 to be incorporated into an operative version 25.

Figure 4:
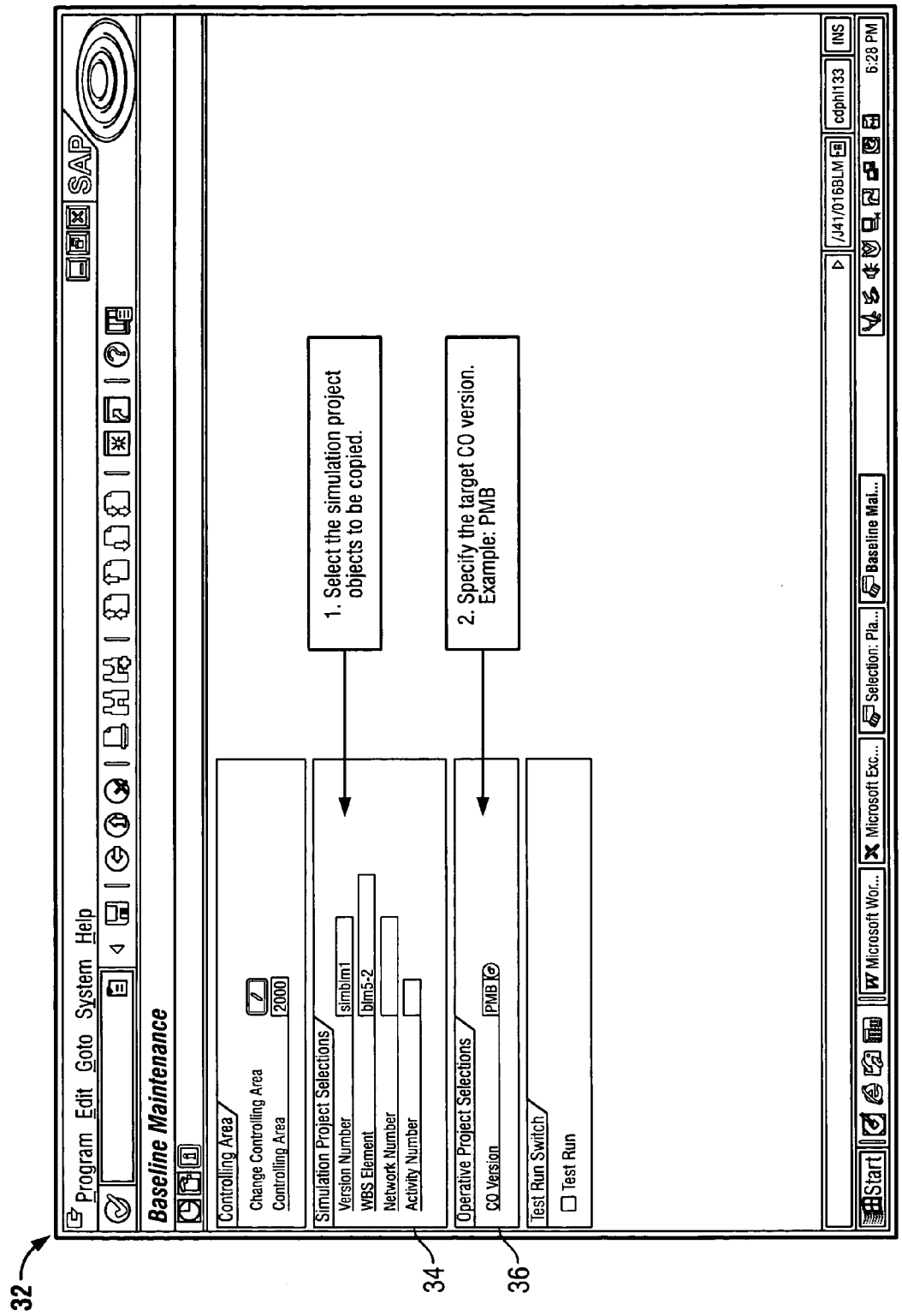

FIG. 4 shows a screen 32 that is used to select a simulation project object 34 to be copied to the operative version. For example, the simulation project object may be an update (e.g., addition to) to the simulation version. Screen 32 also allows the user to specify an operative version 36 to which the simulation object is to be copied.

Figure 5:
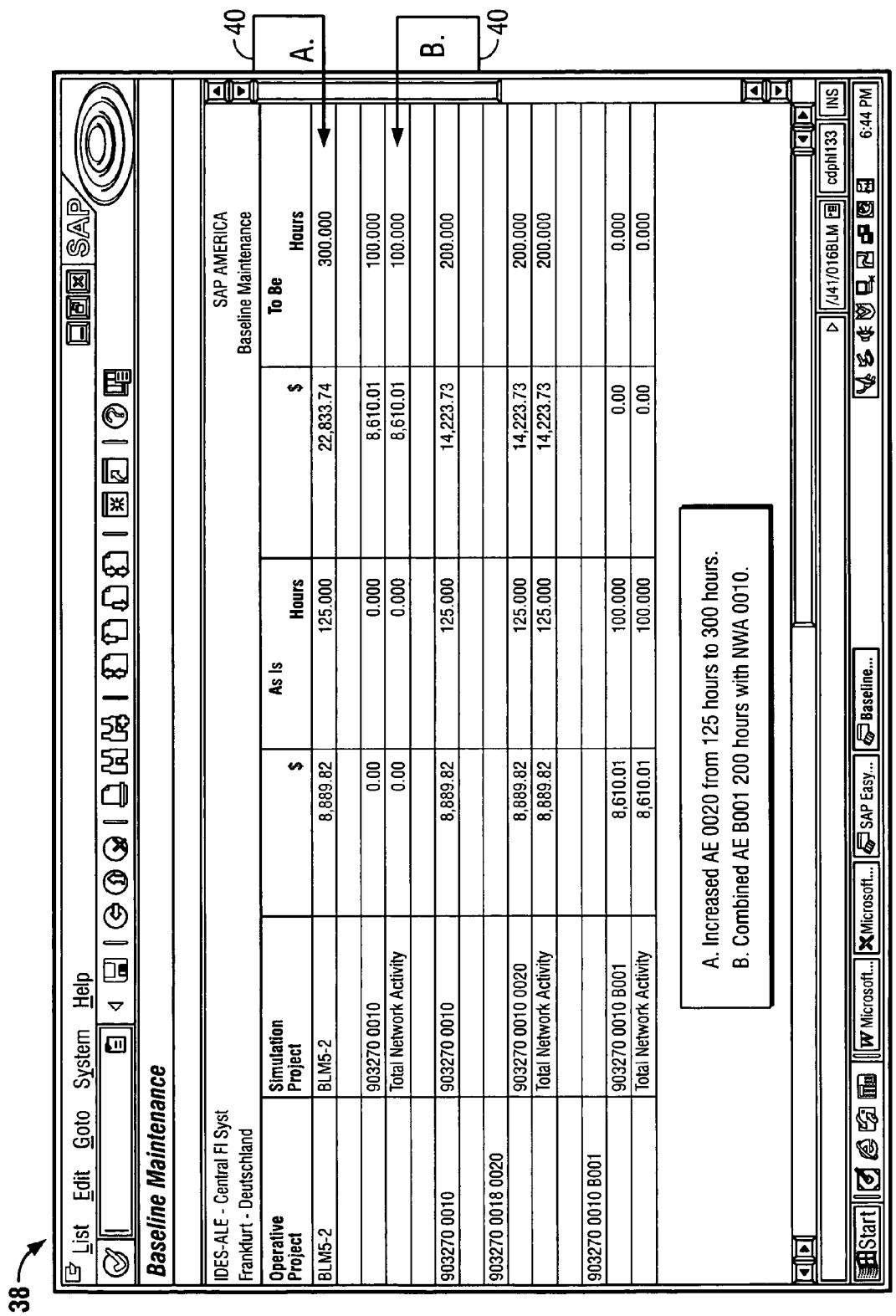
Figure 6:
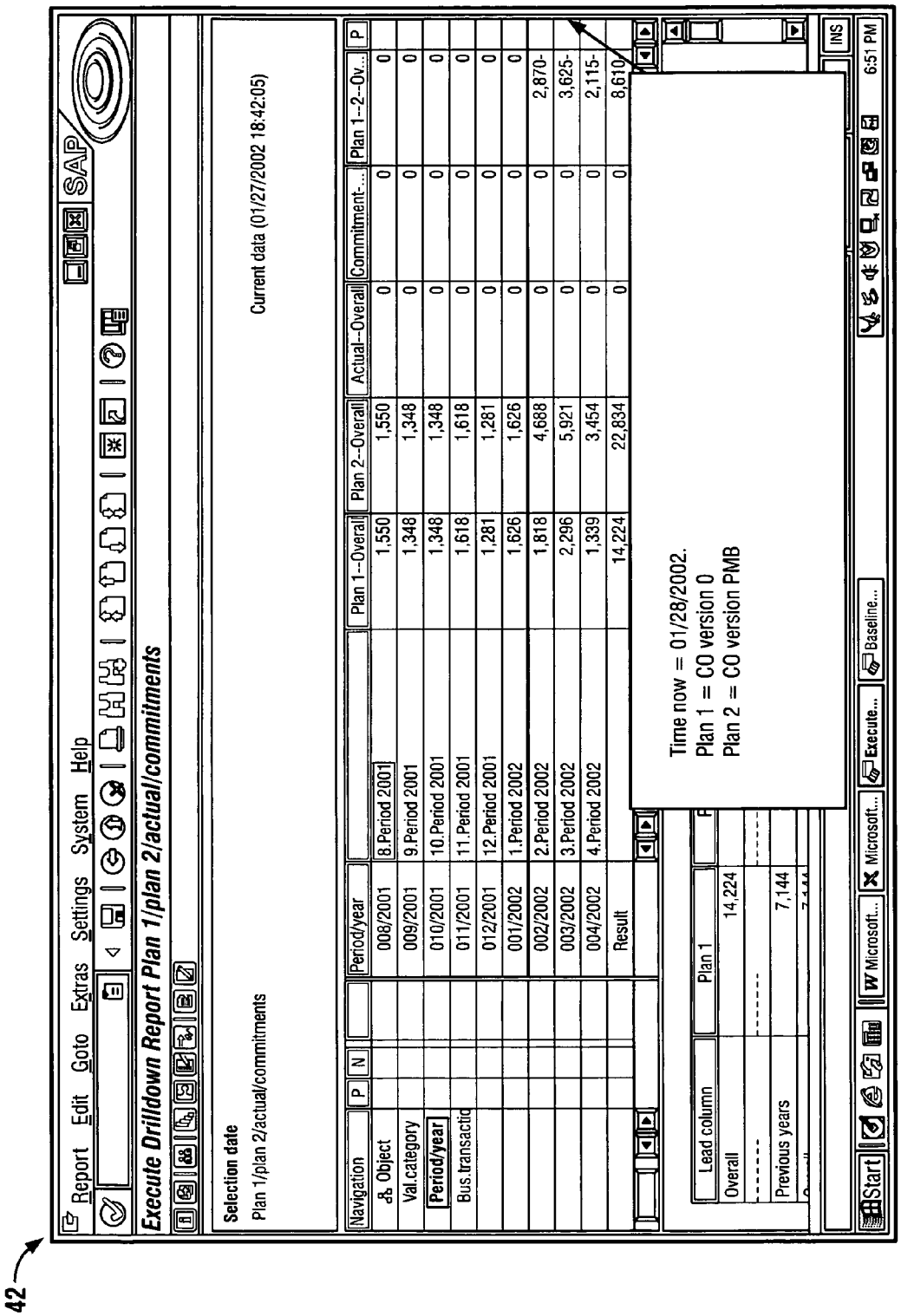

FIG. 5 shows a report 38 that may be generated by process 10. The report identifies each project, contains modifications 40 to the baseline (e.g., an increase in hours per WBS), and indicates which WBSs have been combined. FIG. 6 shows a second report 42 that may be generated by process 10. This report enables comparison of different projects, e.g., "Plan 1" and "Plan 2".

Over Target Baseline

Over target baseline ("OTB") allows a user to change a project baseline to make project measurements more realistic and consistent with actual working conditions. OTB includes two processes: replanning and reprogramming. To begin, some terms are defined as follows.

"Budgeted Cost for Work Performed" ("BCWP") is a sum of budgets for completed WBSs and completed portions of incomplete WBSs, plus an applicable portion of budgets for a level of effort and apportioned effort. "Budgeted Cost for Work Scheduled" ("BCWS"), also called "planned earned value", is a sum of budgets for all WBSs, planning packages, etc., scheduled to be accomplished (including in-process WBSs), plus the amount of level of effort and apportioned effort scheduled to be accomplished within a given time period. "Actual Cost of Work Performed" ("ACWP") comprises the costs actually incurred and recorded in accomplishing work performed within a given time period. BCWS, BCWP and ACWP may be included in the stored baseline.

The earned value application described herein provides the capability to replan selected WBSs, as well as reprogram (re-baseline) an entire project. In such cases, it may be the case that a current time-phased performance measurement baseline for an entire project, or a portion of the project, is no longer a valid basis to measure project performance against (due, e.g., to large schedule and/or cost deviations from an original baseline, i.e., plan).

The replanning process may be applied to improve the time-phased baseline plan for a project, while holding the earned value of the project constant. Through replanning, schedule variances (i.e., BCWS minus BCWP), if any, of one or more WBSs in a project are eliminated by making period adjustments to BCWS to set its cumulative-to-date value equal to the cumulative-to-date value of BCWP. This replanning also may involve an evaluation of the time phasing of the remaining work/costs and possible adjustments to ensure that new time-phased targets for the project are consistent with reasonable schedule plans and resource consumptions. However, as noted, the earned value for the project remains constant during this process.

The reprogramming process involves making adjustments for either an entire project or a large structural branch of a project. Two options exist for reprogramming: elimination of cumulative-to-date schedule variances only, or elimination of cost variances and schedule variances. The process of eliminating schedule variances (BCWS=BCWP) is similar to the replanning process described above, except that it occurs over an entire project (or large portion thereof), rather than individual WBSS. However, the reprogramming process, whereby both cumulative-to-date cost and schedule variances are eliminated, is somewhat different. In this process, BCWS and BCWP are adjusted so that they are equal to ACWP.

Reprogramming is typically initiated when the total project baseline appears unrealistic as a meaningful target to measure performance against. Thus, reprogramming may also includes revaluating the remaining work of a project to a more meaningful performance target, which may or may not include changing the earned value for the project.

In this embodiment, OTB is comprised of a number of computer programs. These computer programs include the snapshot program, the replanning program, the reprogramming program, and the delta posting program.

The OTB snapshot program allows users to capture the current status of BCWS and BCWP. The OTB snapshot program may obtain these from the project baseline (the operative version). The current status, before OTB reprogramming, can be compared to the results of OTB reprogramming. The resulting differences can be evaluated and exported to external applications, as described in more detail below.

The OTB replanning program affects the time schedule for a task (e.g., WBS, network, activity) while holding the overall budget for the task constant. The replanning program eliminates schedule variances by adjusting a current cumulative BCWS in a baseline so that it is equal to a current cumulative BCWP, as described above. The replanning program also permits selective adjustment of values in a plan. For example, the replanning program permits reassignment of task earned values on a date before replanning occurred to a date after replanning occurred. This reassignment does not change a total earned value for a project, but rather when earned value accrues.

Figure 7:
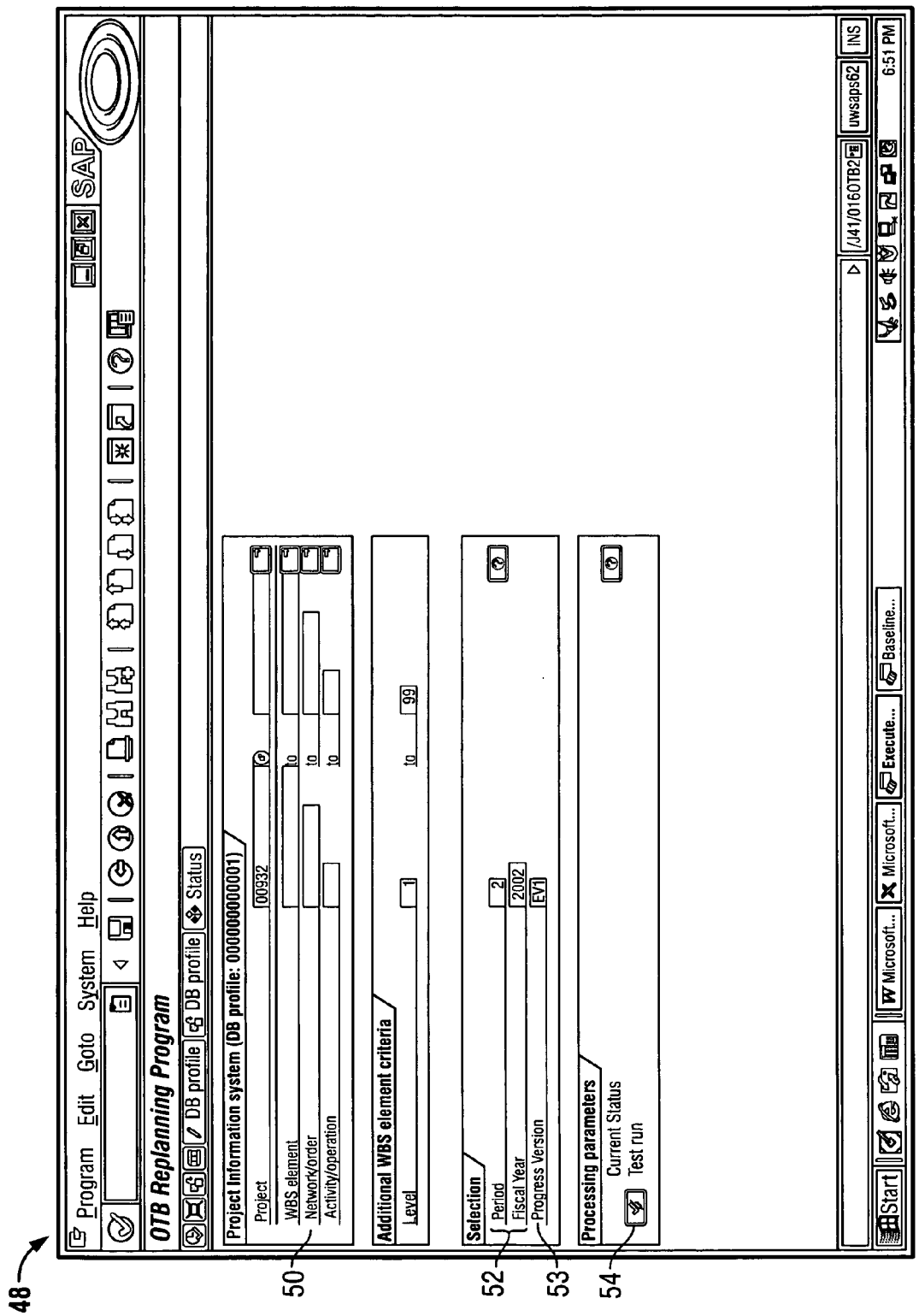
Figure 8:
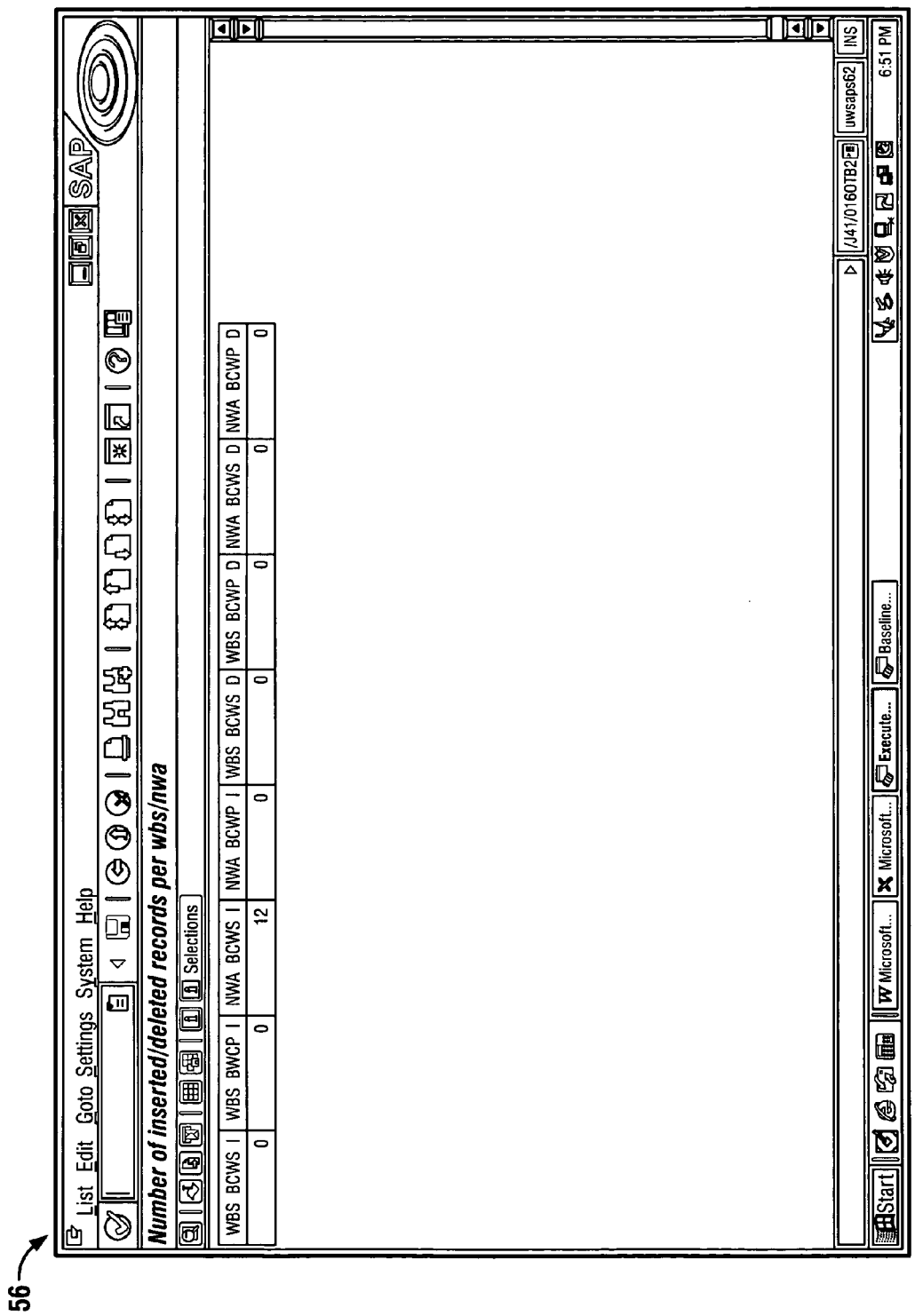

The replanning program generates and displays screen 48 (FIG. 7). A user enters one or more of the following into fields 50 to identify a project (project definition) or a portion thereof: WBS element, network, and/or activity. A user also enters a time 52 (e.g., period/month, fiscal year) over which the project is to be replanned, the "progress version" 53 to be replanned (e.g., the WBS), and clicks on icon 54 to run replanning. A screen 56 (FIG. 8) may be displayed showing which project record(s) have been inserted/deleted as a result of replanning.

Figure 9:
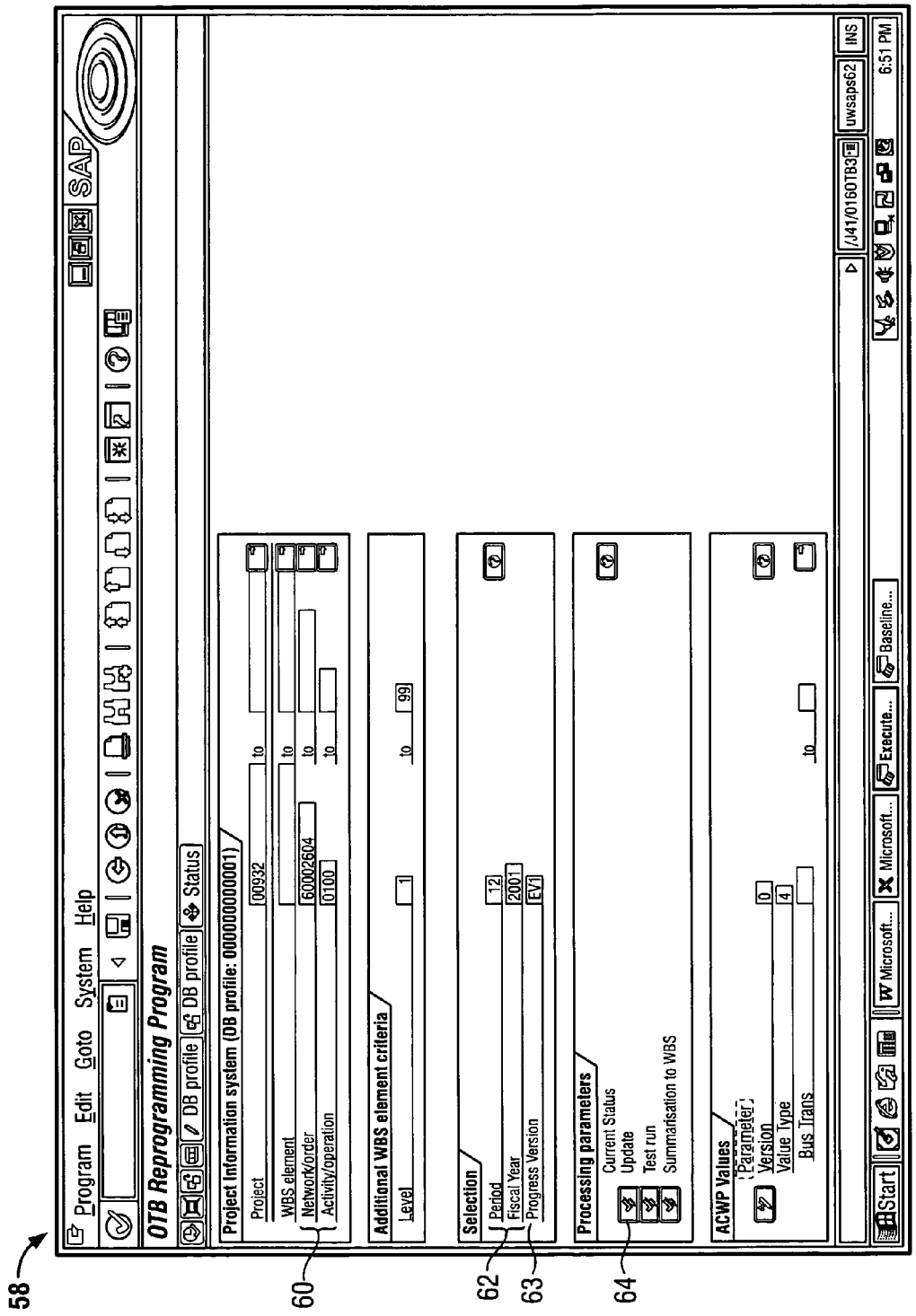
Figure 10:
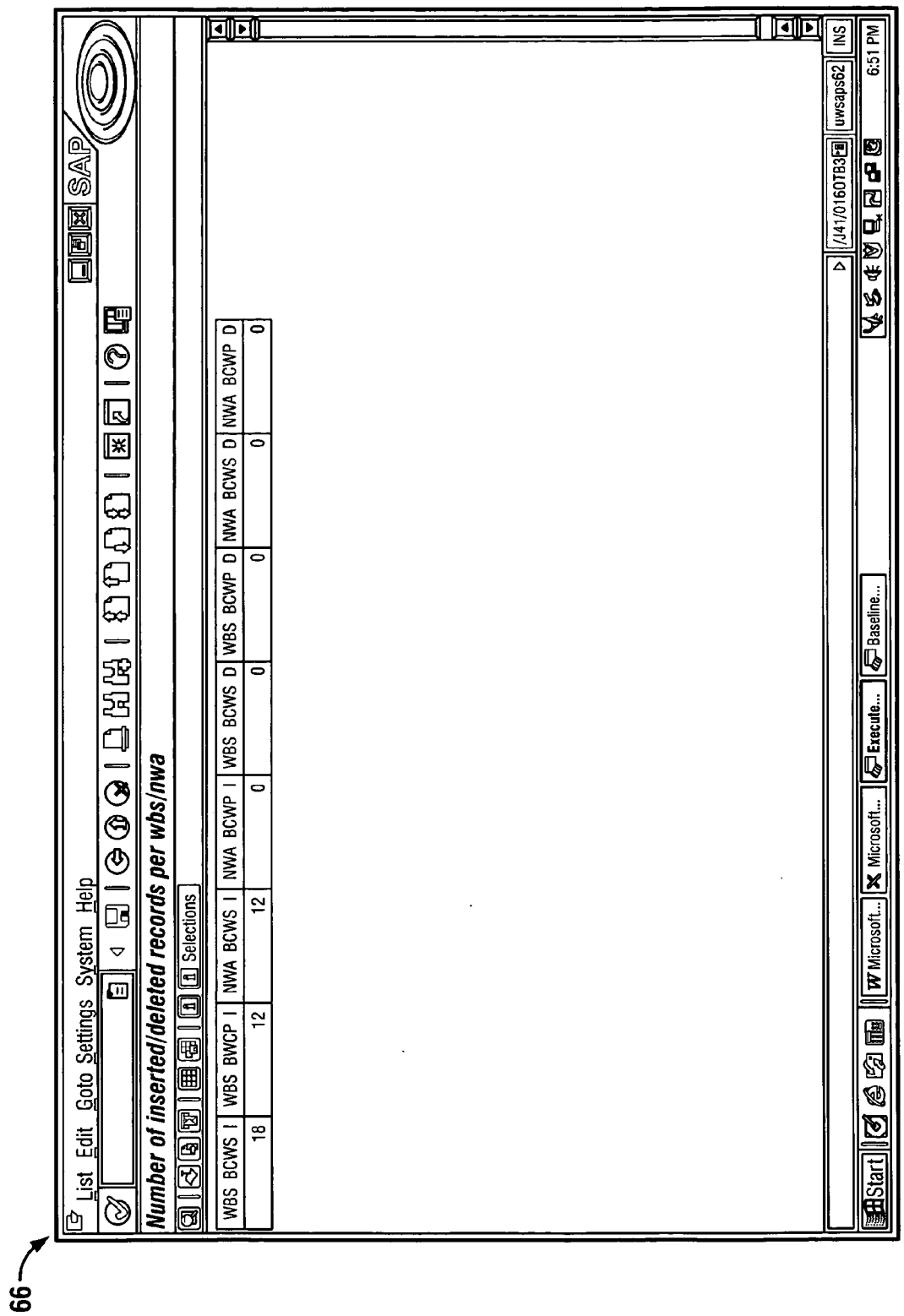

The OTB reprogramming program is used to eliminate cumulative-to-date schedule variances (BCWP minus BCWS) and cost variances (BCWP minus ACWP). This process is typically initiated when a project's baseline, or a large segment thereof, becomes unrealistic. The reprogramming program generates screen 58 (FIG. 9). There, a user identifies a project, or portion thereof, by project definition, WBS, network, and/or activity fields 60. A user also enters, into screen 58, the time 62 over which the project is to be reprogrammed, the progress version 63 to be reprogrammed, and clicks on icon 64 to run the reprogramming, thus updating the baseline. A screen 66 (FIG. 10) may be displayed showing which project record(s) have been inserted/deleted from the baseline due to reprogramming.

Figure 11:
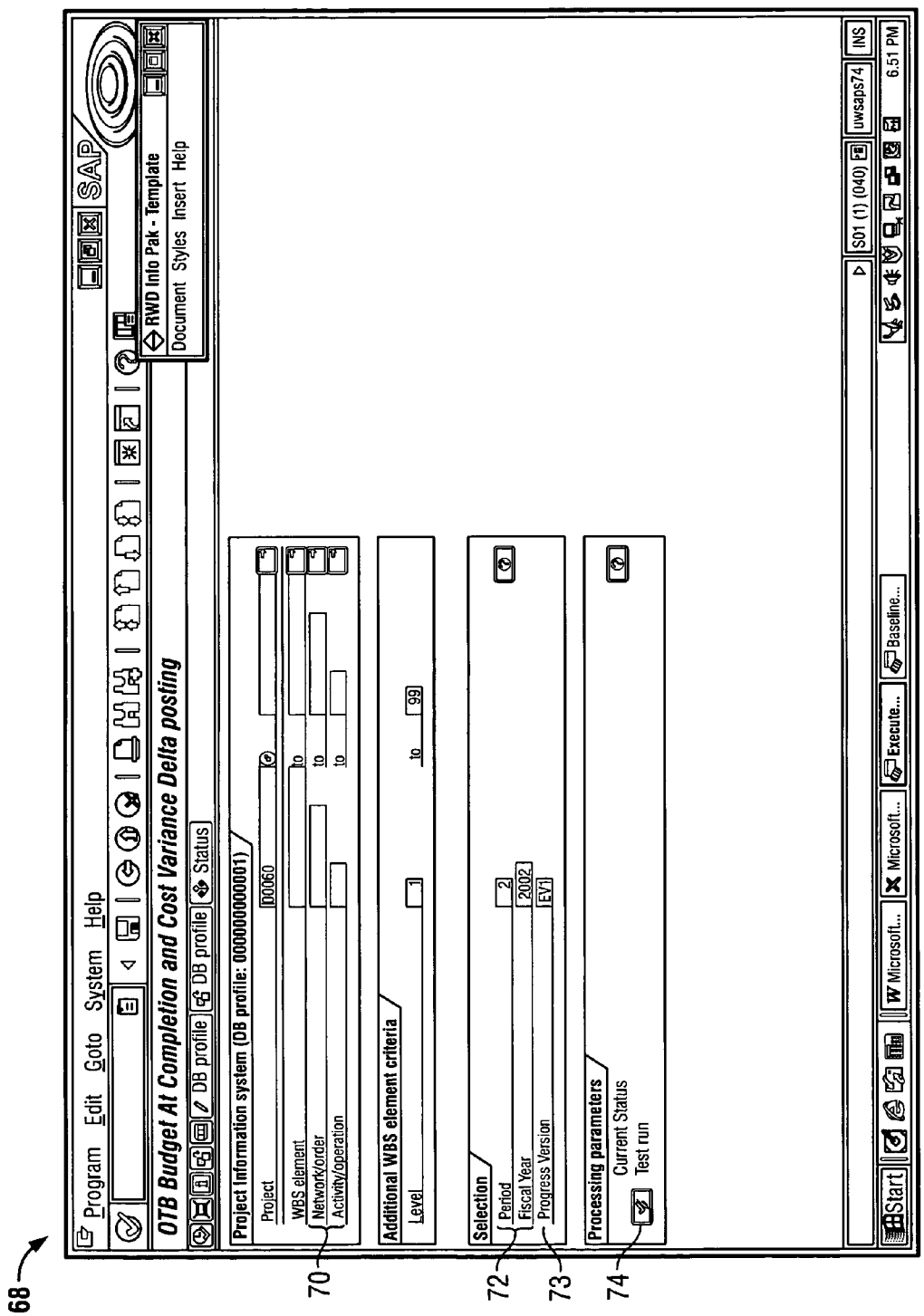
Figure 12:
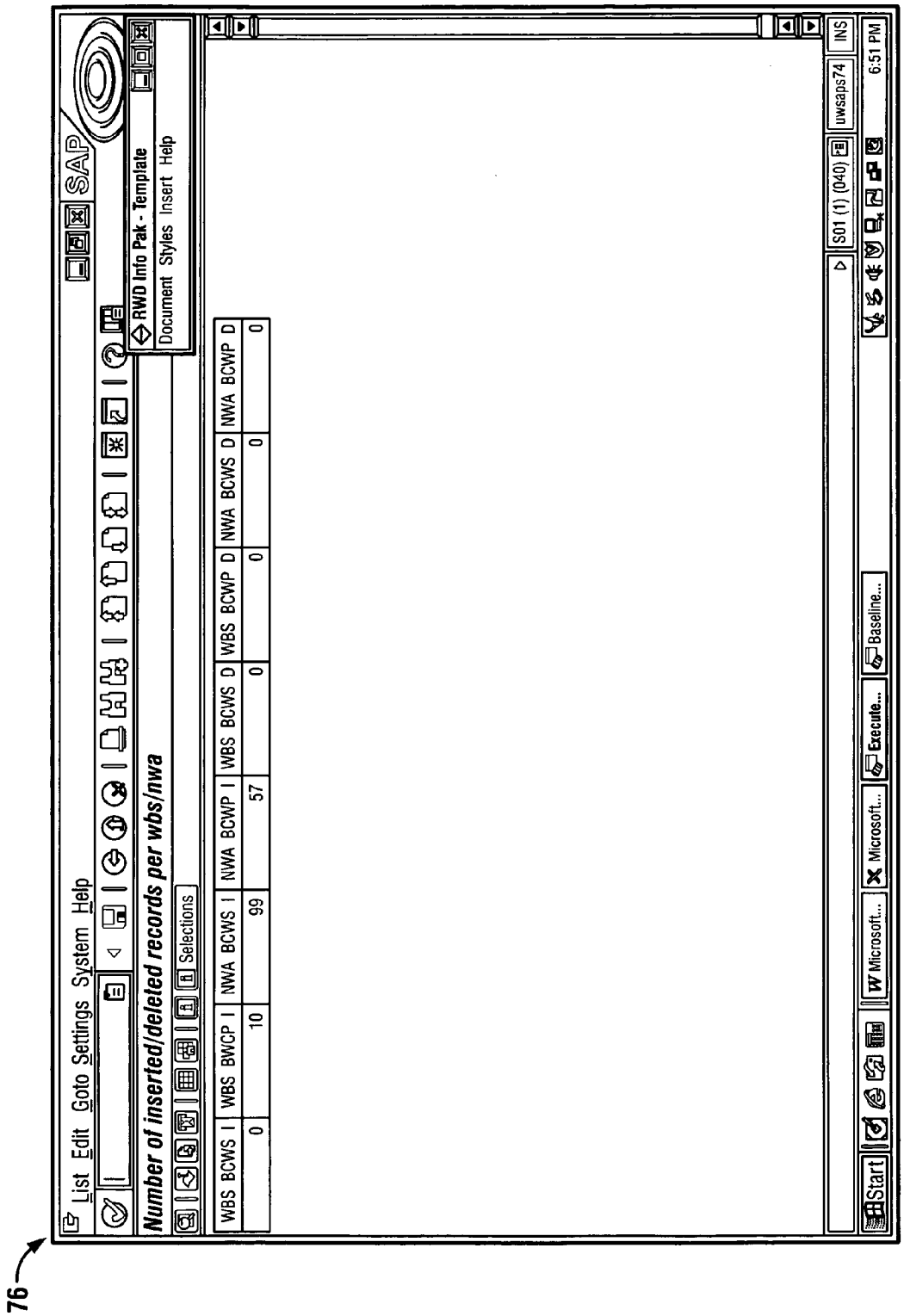

OTB also includes a "delta posting" program. The delta posting program allows users to compare a replanned or reprogrammed BCWS and/or BCWP to prior values that were captured via the OTB snapshot program. The differences (or "delta" values) between the original BCWS/BCWP and the current BCWS/BCWP may be viewed and/or exported to an external application. FIG. 11 (screen 68) allows a user to identify a project, or portion thereof, via project definition, WBS, network, and/or activity fields 70. A user also enters a time 72 that the snapshot data was taken, the progress version 73, and clicks on icon 74 to obtain the delta values. A screen 76 (FIG. 12) may be displayed showing which project record (s) have been deleted from the current BCWS/BCWP.

Third-Party Software Interface

The third-party software interface provides an outbound interface from the earned value application to third-party software, over which earned value performance data is transferred to software owned by the third party.

The third-party software interface extracts information determined by the earned value application and generates a standard XML file to contain the information. The structure of the XML file is determined by specifications supplied by the third party.

A process for extracting the earned value information may employ periodic extracts of user-specified cumulative-period-to-date information for the following variables stored in/obtained from the project baseline: BCWS, BCWP, ACWP, BAC (Budget At Completion: the sum of all budgets for individual work elements within a project) and LRE (Latest Revised Estimate: revised budget). Information other than this may also be extracted and reported.

The generated XML file is also structured to support the creation of NASA 533 reporting formats (provided the third party software functionality is enhanced to create such a report). All of the extracted performance measurement information may include both dollar values as well as quantity-based (i.e., hours-based) earned values.

Hardware and Software

Figure 13:
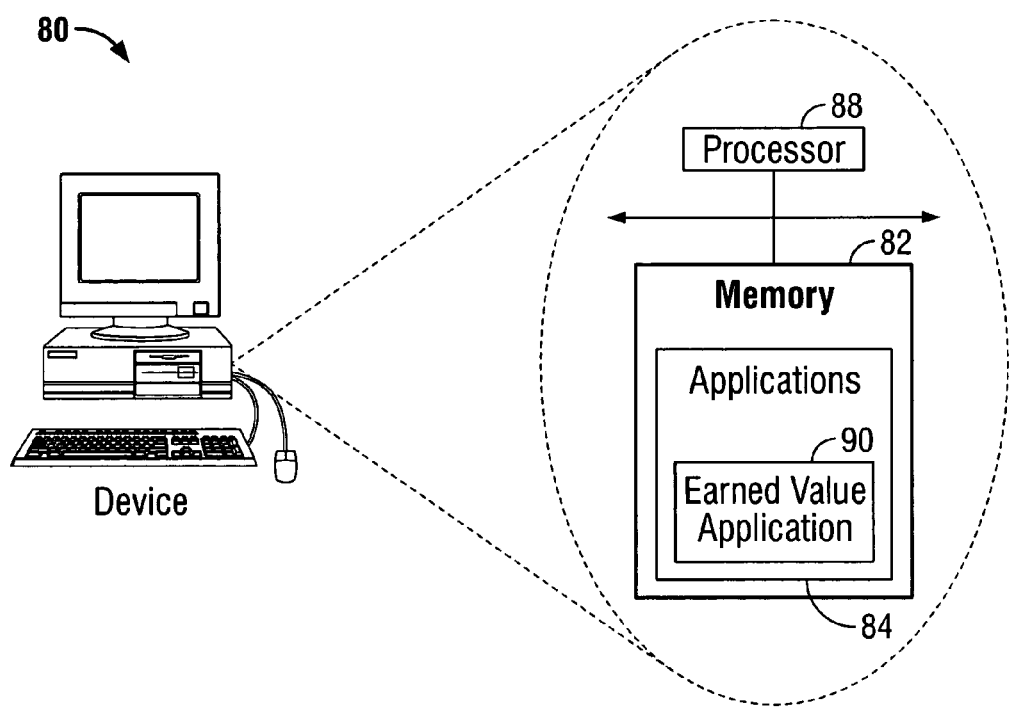
FIG. 13 is a block diagram of computer hardware on which the process of FIG. 1 may be implemented.

FIG. 13 shows an example of a computing device that is capable of executing the earned value application described herein. Examples of such devices include, but are not limited to, a special-purpose computer, a personal computer ("PC"), a workstation, a server, a laptop, a Web-enabled telephone, a Web-enabled personal digital assistant ("PDA"), and an interactive television set. Such devices may incorporate any number of components, and/or peripherals, such as memory/storage devices, input devices, output devices, user interfaces, and/or interfaces.

As shown in FIG. 13, device 80 may include memory 82 to store one or more applications 84, including, but not limited to, earned value application 90 and its components to perform baseline maintenance, over target baseline, and third party software interface functions. Device 80 also includes a processor 88 to execute earned value application 90, in addition to other applications, such as an operating system, a Web browser, and the like.

Other Embodiments

The processes described herein for use with earned value application 90 may find applicability in any computing or processing environment. These processes may be implemented using software, hardware (including circuitry such as a processor, memory, logic gates, and/or programmable logic), or a combination thereof.

The processes for use with earned value application 90 may be implemented using one or more computer programs executing on one or more programmable computers or other machines that each includes a processor and a storage medium that is readable by the processor.

Each such program may be implemented in a high-level procedural or object-oriented programming language to communicate with a computer system. However, the programs can be implemented in assembly or machine language. The language may be a compiled or an interpreted language.

Each computer program may be stored on a storage medium or other article of manufacture (e.g., CD-ROM, hard disk, or magnetic diskette) that is readable by a general or special purpose programmable computer for configuring and operating the computer when the storage medium or device is read by the computer to execute the processes described herein for obtaining and reporting earned value. These processes may also be implemented as one or more machine-readable storage media, configured with one or more computer program(s), where, upon execution, instructions in the computer program(s) cause one or more machines to operate to in accordance with earned value application 90.

The invention is not limited to the embodiments described herein. For example, the invention is not limited to use with all three components described herein, i.e., baseline maintenance, over target baseline, and the third party software interface. One or more of these components may be implemented on its own or in conjunction with other software. One or more of these components may also be omitted from earned value application 90.

The invention is not limited to the performance baselines described herein or to measuring earned value in terms of money or hours. Other measurements may be used.

One or more blocks shown in the flowchart of FIG. 1 may be rearranged, substituted, or omitted. As such, operations performed by process 10 are not limited to the flow pattern shown in the flowchart.

Other embodiments not described herein are also within the scope of the following claims.

What is claimed is:

1. A method performed on a processing device, comprising:

storing, via the processing device, a simulation version of a project baseline, the simulation version comprising first objects that define elements of the project baseline;

copying, via the processing device, the simulation version to create an operative version of the project baseline;

augmenting, via the processing device, the simulation version by associating second objects with the first objects, the first objects being separate from the second objects, the second objects remaining separate from the first objects and apart from the simulation version, and the first objects not changing when the simulation version is augmented thereby maintaining an original version of the project baseline despite subsequent baseline changes;

changing, via the processing device, the operative version to produce an updated project baseline by combining existing operative version data in the first objects with changes to the simulation version from the second objects, the operative version comprising third objects that correspond to combinations of first and second objects;

wherein changes are effected only to a portion of the project baseline in the operative version that succeeds a time at which the operative version is changed;

obtaining, via the processing device, an earned value for a project that corresponds to the project baseline to which the changes are effected, the earned value being obtained via the changed operative version; and providing an option to replan the project baseline in order to affect a timing of tasks occurring in the project baseline while holding the earned value constant.

2. The method of claim 1, wherein the earned value is obtained based on an amount of work done on the project and a pre-assigned value for the project baseline.

3. The method of claim 2, wherein the amount of work done corresponds to a portion of the project that has been completed.

4. The method of claim 2, wherein:
the project baseline comprises a number of tasks, each of the tasks having an assigned value; and
wherein obtaining the earned value comprises:
determining which of the tasks has been completed; and
combining assigned values for completed tasks.

5. The method of claim 1, wherein changing the operative version in connection with changes to the simulation version comprises:
augmenting the simulation version with a task, the task being defined by the second objects;
wherein the third objects account for the task prior to obtaining the earned value.

6. The method of claim 5, wherein augmenting comprises adding the second objects to the simulation version but keeping the second objects separate from the first objects.

7. The method of claim 5, wherein a portion of the operative version that precedes a time that the task is incorporated is unchanged.

8. The method of claim 5, wherein a portion of the operative version that succeeds a time that the task is incorporated is changed.

9. The method of claim 5, wherein the task is selected from among other tasks for mapping to the operative version.

10. A non-transitory machine-readable medium that stores executable instructions which, when executed, cause a machine to:
store a simulation version of a project baseline, the simulation version comprising first objects that define elements of the project baseline;
copy the simulation version to create an operative version of the project baseline;
augment the simulation version by associating second objects with the first objects, the first objects being separate from the second objects, the second objects remaining separate from the first objects and apart from the simulation version, and the first objects not changing when the simulation version is augmented thereby maintaining an original version of the project baseline despite subsequent baseline changes;
change the operative version to produce an updated project baseline by combining existing operative version data in the first objects with changes to the simulation version from the second objects, the operative version comprising third objects that correspond to combinations of first and second objects;
wherein changes are effected only to a portion of the project baseline in the operative version that succeeds a time at which the operative version is changed;
obtain, via the changed operative version, an earned value for a project that corresponds to the project baseline to which the changes are effected; and
providing an option to replan the project baseline in order to affect a timing of tasks occurring in the project baseline while holding the earned value constant.

11. The machine-readable medium of claim 10, wherein the earned value is obtained based on an amount of work done on the project and a pre-assigned value for the project baseline.

12. The machine-readable medium of claim 11, wherein the amount of work done corresponds to a portion of the project that has been completed.

13. The machine-readable medium of claim 11, wherein:
the project baseline comprises a number of tasks, each of the tasks having an assigned value; and
wherein obtaining the earned value comprises:
determining which of the tasks has been completed; and
combining assigned values for completed tasks.

14. The machine-readable medium of claim 10, wherein changing the operative version in connection with changes to the simulation version comprises:
augmenting the simulation version with a task, the task being defined by the second objects;
wherein the third objects account for the task prior to obtaining the earned value.

15. The machine-readable medium of claim 14, wherein augmenting comprises adding the second objects to the simulation version but keeping the second objects separate from the first objects.

16. The machine-readable medium of claim 14, wherein a portion of the operative version that precedes a time that the task is incorporated is unchanged.

17. The machine-readable medium of claim 14, wherein a portion of the operative version that succeeds a time that the task is incorporated is changed.

18. The machine-readable medium of claim 14, wherein the task is selected from among other tasks for mapping to the operative version.

* * * * *